Aug. 2, 1927.
H. A. LACERDA
1,637,949
BOILER TOOL
Filed Feb. 18, 1926
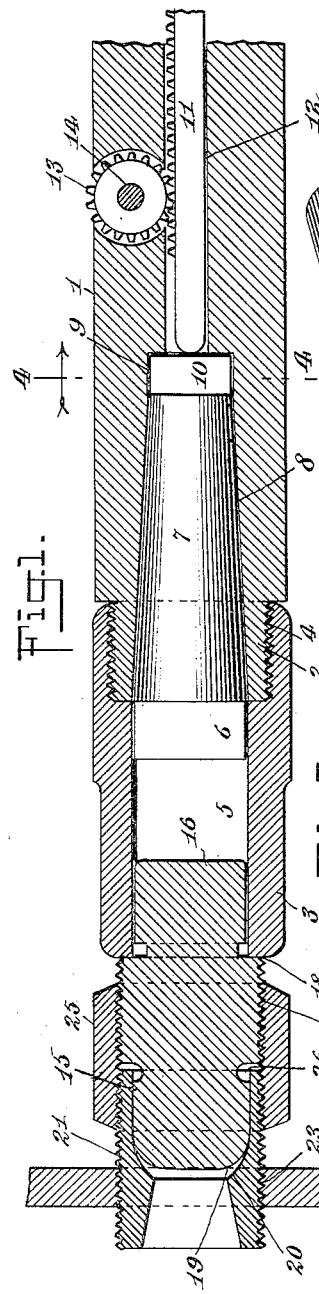
INVENTOR
Harry A. Lacerda
BY
ATTORNEYS
WITNESSES Patented Aug. 2, 1927.

1,637,949

UNITED STATES PATENT OFFICE.

HARRY ANTHONY LACERDA, OF WATERVLIET, NEW YORK.

BOILER TOOL.

Application filed February 18, 1926. Serial No. 89,125.

This invention relates to boiler tools and more particularly to a tool designed for use in connection with the manipulation of flexible stay-bolt sockets and flexible stay bolts, an object of the invention being to provide a tool which is in effect an attachment for a power-driven rotary device which will function to screw a socket into a boiler sheet without exerting any pressure or contact whatever with the end of the socket member. This is very important, as with tools such as ordinarily made pressure is had against the end of the socket member so as to, in many cases, render this surface more or less uneven so that when the cap is screwed onto the socket member a certain amount of leakage ensues, which must be overcome and which would cause trouble, annoyance, and even danger.

A further object is to provide a tool of this character which by a slight modification is adapted for screwing the flexible stay bolt into or out of place.

With these and other objects in view, the invention consists in certain novel features of construction and combinations and arrangements of parts, which will be more fully hereinafter described and pointed out in the claims.

In the accompanying drawings—

Fig. 1 is a view in longitudinal section, illustrating my improved device in the operation of screwing a socket into position in a boiler sheet;

Fig. 2 is a view in side elevation of my improved coupling head;

Fig. 3 is a perspective view of my improved socket;

Fig. 4 is a view in transverse section on the line 4—4 of Fig. 1;

Fig. 5 is a view, mainly in longitudinal section but partly in elevation, illustrating a slightly modified form of socket member, showing the use of the same in position to turn a flexible stay bolt;

Fig. 6 is an end view of the socket member shown in Fig. 5 with the key therein; and Fig. 7 is a view in elevation of the key shown in Figs. 5 and 6.

1 represents a portion of a rotary power-driven device, which for convenience of description I shall refer to as a shank. This shank 1 has an externally screw-threaded nipple 2 at its forward end, which is adapted to receive thereon my improved socket 3, the latter internally screw-threaded at one end, as shown at 4, to mesh with the threads of the nipple 2 so as to securely couple the parts together, as clearly shown in Fig. 1.

This socket member 3 has an angular bore 5, and in this angular bore 5 the angular end 6 of a coupling key 7 is positioned. The shank 1 at its forward end has a truncated conical or tapering bore 8 receiving the truncated conical or tapering intermediate portion of the key 7, and said shank is also made at the inner end of said bore 8 with an angular recess 9 receiving an angular end 10 on key 7. Hence these angular portions 6 and 10, engaging in correspondingly shaped angular portions or recesses in the socket 3 and shank 1, hold the parts keyed together when the key member is in one extreme position, as shown in Fig. 1.

If there is any tendency of this key member to become jammed in the shank 1, it is desirable to have some means to impart a longitudinal movement thereto, and with this idea in view I provide a rack-bar 11 located in a longitudinal bore 12 of the shank 1, and I provide a pinion 13 in the shank 1 engaging this rack-bar. The pinion 13 is fixed to a shaft 14 on which I may locate any suitable device (not shown) for manually imparting motion to the pinion so as to exert a pressure or release of the bar 13 against the key member 7 to dislodge the same if it should stick or jam, as above explained.

In Fig. 2 I illustrate in elevation my improved head member 15. This head 15 has an angular end 16 to engage in the angular bore 5 of socket 3, and the intermediate portion 17 of said head is appreciably larger in diameter than the end portions of said head and is externally screw-threaded, as shown. By reason of this large intermediate portion 17 a shoulder 18 is provided on the head which engages the end of the socket 3, as clearly shown in Fig. 1.

The forward end of the head 15 is of general cylindrical form having a somewhat convex shape at its forward extremity, as shown at 19, so as to conform to a certain extent to the shape of the recess 20 in a stay-bolt socket or sleeve member 21. This sleeve 21 is of the standard type to receive a stay bolt 22 and is screwed into a threaded opening 23 in a boiler sheet 24.

25 represents a coupling sleeve which is internally screw-threaded and which is adapted to couple the sleeve 21 with the head 15. It will be noted that the screw-threaded portion 17 of the head 15 is of the same external diameter as the external diameter of the sleeve 21, and as both of these parts are externally screw-threaded, the sleeve 25, which is internally screw-threaded, functions to couple said parts together.

It will be noted, however, that the forward end of the head 15 is of such length that it will engage the interior walls of the sleeve member 21 and prevent any possibility of the end of the sleeve member coming into contact with the enlarged portion 17 of the head member. This is emphasized by the showing of an annular recess 26 in the head member into which the end of the sleeve member projects but does not contact with the head member.

When the parts are positioned as shown in Fig. 1, the stay-bolt socket or sleeve member may be screwed into or out of position and any desired pressure applied without any contact with the end of the sleeve member 21 so that there is no possibility of injuring the smooth face of this end of the sleeve member. Hence when the cap (not shown) is screwed onto the sleeve member a perfectly water-tight joint will be had.

In Figs. 5, 6, and 7 I illustrate a modification of my invention in which the sleeve member 27, corresponding to the socket member 3, is formed in one end with opposed recesses 28 adapted to receive a removable key 29 therein. This key 29 projects beyond the end of the sleeve member and is adapted to be engaged in the groove 30 of the spherical head 31 of the flexible stay bolt 22 so that the device can operate as a screw-driver to screw the bolt into the boiler sheet 32 or remove the same therefrom, and I may employ any suitable driving means for the purpose. In this modification the end of the sleeve 27 is recessed so as to render it concave, as shown at 33, to conform to the shape of the spherical head 31.

The operation of my improved device, as shown in Figs. 1 to 4 inclusive, is as follows: I refer to the part 1 as a shank, as it is to be understood that this part 1 is to be operatively connected to the shaft of the motor to turn the same in either direction, and it is the rotary or turning movement of this shank through the medium of the parts above described which functions to screw the stay-bolt socket 21 into or out of place; and the head 15 engaging in the stay-bolt socket 21 will prevent any possibility of the parts jamming the end of said stay-bolt socket member regardless of the pressure employed.

Various slight changes and alterations might be made in the general form of the parts described without departing from my invention; and hence I do not limit myself to the precise details set forth, but consider myself at liberty to make such slight changes and alterations as fairly fall within the spirit and scope of the appended claims.

I claim:

1. A tool of the character described, comprising a socket member adapted to be removably coupled to a rotary driving means, a head member removably coupled to the socket member and having an enlarged externally screw-threaded portion intermediate its ends, and an internally screw-threaded coupling sleeve adapted to couple a stay-bolt socket to said head, said head at its forward end adapted to engage within the stay-bolt socket and prevent contact of the end of the stay-bolt socket with said head member.

2. A tool of the character described, comprising a socket member adapted to be removably coupled to a rotary driving means, a head member removably coupled to the socket member and having an enlarged externally screw-threaded portion intermediate its ends, and an internally screw-threaded coupling sleeve adapted to couple a stay-bolt socket to said head, said head at its forward end adapted to engage within the stay-bolt socket and prevent contact of the end of the stay-bolt socket with said head member, said head member having an annular recess receiving the end of the stay-bolt socket.

3. A tool of the character described, comprising a socket member adapted to be removably coupled to a rotary driving means, a head member removably coupled to the socket member and having an enlarged externally screw-threaded portion intermediate its ends, and an internally screw-threaded coupling sleeve adapted to couple a stay-bolt socket to said head, said head at its forward end adapted to engage within the stay-bolt socket and prevent contact of the end of the stay-bolt socket with said head member, said first-mentioned socket member having an angular bore, and an angular end on the head member engaging in said bore.

4. In combination with a rotary power-driven shank, a socket member having screw-threaded engagement therewith, a head member connected to the socket member and adapted to be coupled to a stay-bolt socket, said first-mentioned socket member having an angular bore, said shank having a tapering portion and an angular recess at one end thereof, a key fitting the bores of the socket member and the shank member, a longitudinally movable rack in the shank member, and a pinion engaging said rack and adapted to operate the same to dislodge the key member.

HARRY ANTHONY LACERDA.